(12) United States Patent
Greganti et al.

(10) Patent No.: US 12,259,573 B2
(45) Date of Patent: Mar. 25, 2025

(54) OPTICAL DEVICE AND DISPLAY PANEL

(71) Applicant: VitreaLab GmbH, Vienna (AT)

(72) Inventors: Chiara Greganti, Vienna (AT); Jonas Zeuner, Vienna (AT)

(73) Assignee: VITREALAB GMBH, Wein (AT)

( * ) Notice: Subject to any disclaimer, the term of this patent is extended or adjusted under 35 U.S.C. 154(b) by 315 days.

(21) Appl. No.: 17/904,659

(22) PCT Filed: Mar. 3, 2021

(86) PCT No.: PCT/EP2021/055358
§ 371 (c)(1),
(2) Date: Aug. 19, 2022

(87) PCT Pub. No.: WO2021/175932
PCT Pub. Date: Sep. 10, 2021

(65) Prior Publication Data
US 2023/0102740 A1 Mar. 30, 2023

(30) Foreign Application Priority Data
Mar. 3, 2020 (EP) .................................... 20160644

(51) Int. Cl.
F21V 8/00 (2006.01)
(52) U.S. Cl.
CPC ......... *G02B 6/0076* (2013.01); *G02B 6/0055* (2013.01); *G02B 6/0065* (2013.01)
(58) Field of Classification Search
CPC ... G02B 6/0076; G02B 6/0055; G02B 6/0065
See application file for complete search history.

(56) References Cited

U.S. PATENT DOCUMENTS 7,773,849 B2 8/2010 Shani
2007/0086712 A1* 4/2007 Shani ..................... G02B 6/065
385/101
(Continued)

FOREIGN PATENT DOCUMENTS

| EP | 3 017 243 | 1/2015 |
| EP | 3 599 541 A1 | 1/2020 |
| WO | 2015/000965 A1 | 1/2015 |

OTHER PUBLICATIONS

International Search Report for corresponding International Application No. PCT/EP2021/055358 mailed Apr. 30, 2021.
(Continued)

*Primary Examiner* — Anne M Hines
(74) *Attorney, Agent, or Firm* — Chrisman Gallo Tochtrop LLC

(57) ABSTRACT

The present application concerns an optical device for controlling light, the optical device including: a first waveguide for receiving a light beam from an external light source, at least a second waveguide, an optical coupler for coupling a light beam from the first waveguide to the second waveguide, a beam shaping structure with a light emitting area for emitting a light beam, wherein the second waveguide is configured to guide a light beam coupled from the first waveguide to the beam shaping structure, wherein the beam shaping structure is configured to propagate a light beam received from the second waveguide to the light emitting area such that the beam divergence of a light beam emitted from the light emitting area is lower than the beam divergence of the light beam received from the second waveguide.

25 Claims, 10 Drawing Sheets

(56) References Cited

U.S. PATENT DOCUMENTS

2008/0144333 A1    6/2008   Gourlay
2016/0300535 A1   10/2016   Gilbert et al.
2018/0292713 A1   10/2018   Drolet et al.
2019/0369213 A1   12/2019   Jenkins

OTHER PUBLICATIONS

Written Opinion for corresponding International Application No. PCT/EP2021/055358 dated Apr. 30, 2021.
Extended European Search Report for corresponding application EP20160644.9, dated Sep. 15, 2020.
Han et al., "Quantum Dots on Color Filter LCD Design Study", SID 2019 Digest; ISSN 0097-996X/19/4802-1067 (cited on p. 16 of the specification).

* cited by examiner

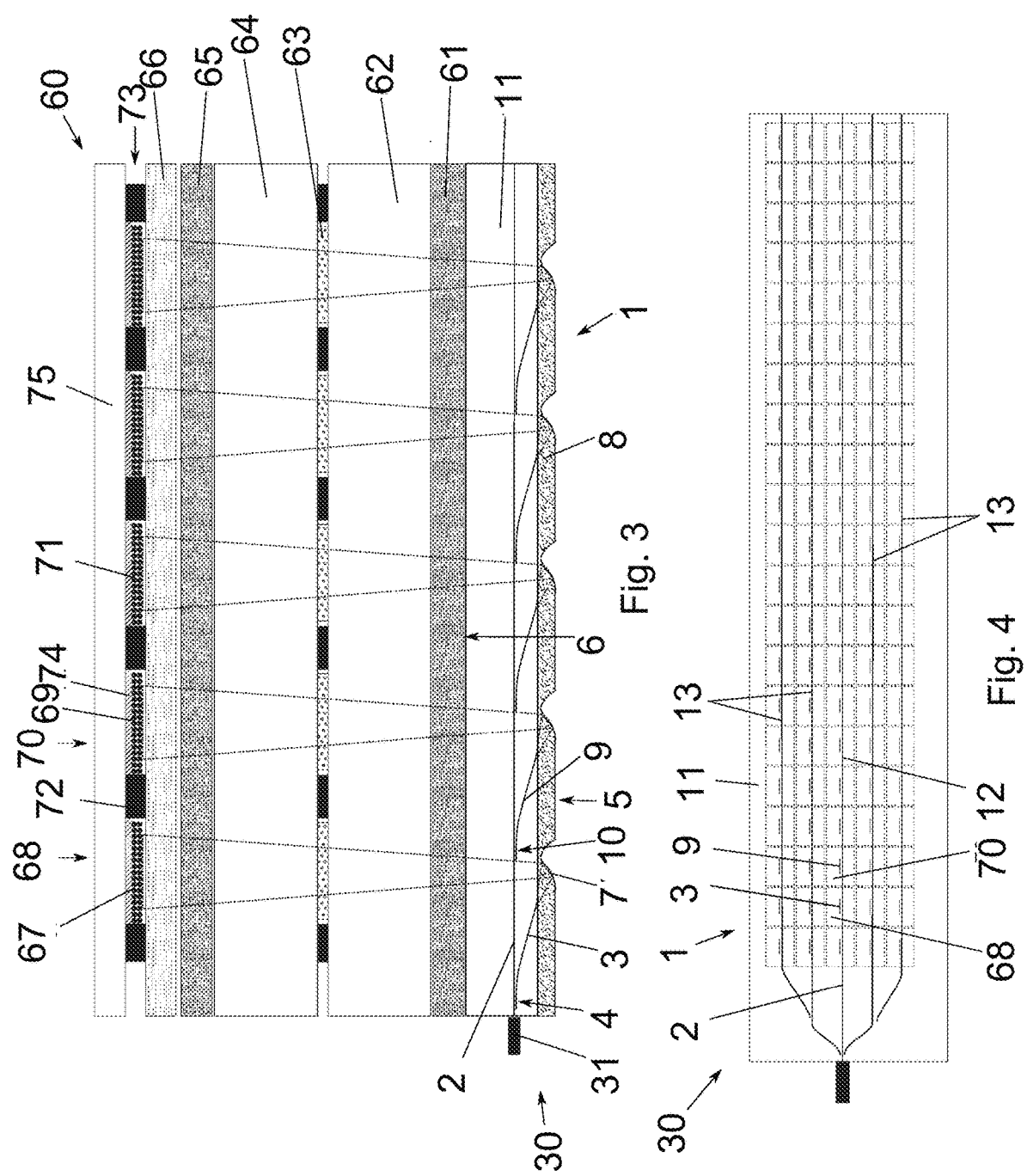

OPTICAL DEVICE AND DISPLAY PANEL

CROSS-REFERENCE TO RELATED APPLICATIONS

This is a National Stage application of PCT international application PCT/EP2021/055358 filed on Mar. 3, 2021, which claims the priority of European Patent Application No. 20160644.9, filed Mar. 3, 2020, which are incorporated herein by reference in their entireties.

FIELD OF THE INVENTION

The disclosure concerns an optical device for controlling light, the optical device comprising:
- a first waveguide for receiving a light beam from an external light source,
- at least a second waveguide,
- an optical coupler for coupling a light beam from the first waveguide to the second waveguide,
- a beam shaping structure with a light emitting area for emitting a light beam,
- wherein the second waveguide is configured to guide a light beam coupled from the first waveguide to the beam shaping structure. Furthermore, the disclosure concerns a backlight unit and a display panel.

BACKGROUND OF THE INVENTION

Some optical devices are known that distribute light over a larger area. This is for example necessary for backlight units of liquid crystal displays (LCDs).

LCDs are the most widely used display technology to date and can be found in devices ranging from smartphones to televisions. In an LCD, the backlight unit, in particular a planar light source, illuminates all pixels and then each pixel acts as a shutter either letting pass the light or partially blocking the light passing through it. The shutter is based on the polarization of light. A light ray emitted by the backlight passes first through the bottom polarizer and becomes polarized. The liquid crystal provides a voltage-controlled way of turning the polarization of this light ray: The liquid crystals are birefringent and their orientation can be adjusted using an electrical field. After leaving the liquid crystal the light ray hits the top polarizer (also called analyzer) and the fraction of the transmission of the light ray through this polarizer depends on the angle of polarization imprinted on the ray in the liquid crystal.

Ideally, a display should show the same image independent of the viewing angle. To achieve this, a pixel should radiate uniformly in all directions. While this is the norm for emissive display technologies like OLED, it is not the case for transmissive technologies like LCD: a light ray observed from the viewer originates from the backlight at the bottom of the LCD display stack. The liquid crystal layer then modulates the intensity of this ray to change the brightness of the pixel.

For rays that propagate at non-normal angles through the display stack, the path length and birefringence axis of the liquid crystal cell seen by the ray is changed and hence the polarization rotation, which encodes brightness, is different than for rays propagating at normal angles. This leads to a variation of brightness for a pixel if the display is viewed from different angles.

A possibility to overcome this issue would be to use a backlight that only emits rays at normal angles (collimated backlight) and then use a diffuser at the top of the display stack. Still, this is typically not done, because in the prior art there is no efficient collimated backlight.

For example, US 2018/0292713 A1 shows a backlit display with a light source. The display may comprise an edge-lit light guide, in which the light emitted from the light source is distributed laterally within the light guide and is scattered out of the light guide by out-coupling structures such as gratings, protrusions or grooves. Alternatively, the display comprises a plurality of adjacent light-emitting diodes with curved reflectors for collimating the light. To help further collimate light, the light source is provided with a filter layer having an angularly dependent light transmission characteristics for reflecting off-axis light. However, this results in a high energy loss and does not achieve a low beam divergence, thus leading to cross-talk between different subpixels.

Another display is shown in US 2016/0300535 A1. There is provided for an array of laser diodes, which emit light directly in the direction of the pixels. The light emitted by the laser diodes is first dispersed by a lens and subsequently collimated by Fresnel lenses. However, this approach requires a large amount of laser diodes for illuminating a display area and does not allow for a thin backlight unit.

Another optical device is shown in EP 3599541 A1. The device comprises a substrate and optical waveguides extending within the substrate and each curving towards a surface of the substrate. In another embodiment, the waveguides can guide the light to a wedge in the substrate forming a flat mirror surface to scatter light out of the substrate. However, in this process, the divergence of the emitted light beams is increased and the resulting divergence angle is very large.

U.S. Pat. No. 7,773,849 B2 shows a device for optical resizing or backlighting for an LCD. Optical resizing refers to the expansion or contraction in the area occupied by an optical wavefront. Therein, for magnification purposes an image is guided through a bundle of waveguides extending from a small facet to a large facet.

US 2008/144333 A1 shows a light guide device including a substrate on which are printed a number of light emitting sections and a number of light guides, the light guides being optically coupled to the light emitting sections.

WO 2015/000965 A1 describes an integrated optical solution for a lighting arrangement with coupling-out units coupling a laser from a main waveguide into multiple auxiliary waveguides.

EP 3 599 541 A1 relates to an optical device for controlling light and an optical touch sensing device, both with optical waveguides formed in a transparent substrate by direct laser writing.

US 2019/369213 A1 shows an optical system with a plurality of optical devices carried by an optical body. Optical waveguides extend within the optical body between respective optical devices and an imaginary curved surface within the optical body. A controller selectively operates the plurality of optical devices to generate at least one optical beam.

BRIEF SUMMARY OF THE INVENTION

It is an objective of the present disclosure, to resolve or alleviate at least some of the problems of the prior art. In particular, the present disclosure shall provide an optical device, which can be used for example in a backlight unit, and which efficiently provides at least one beam with a reduced beam divergence. Optionally, the optical device includes the possibility to provide further collimated beams.

The disclosure proposes an optical device as mentioned in the outset, wherein the beam shaping structure is configured to propagate a light beam received from the second waveguide to the light emitting area such that the beam divergence of a light beam emitted from the light emitting area is lower than the beam divergence of the light beam received from the second waveguide.

By guiding the light beam in a distinct waveguide to the beam shaping structure, its angle of incidence and further characteristics can be precisely adapted such that the beams divergence angle is reduced by the beam shaping structure. This is not possible, when the light is messily distributing in a large slab-like substrate, wherein the light will not impinge on optical elements in a well-defined manner. In this way it is possible with the proposed optical device to provide for a collimated beam, without having to purposefully discard a part of the beam and thereby reducing the brightness and wasting energy. With this light beam, small spots (e.g. individual subpixels of a display) can be illuminated. Thus, when used in a display, it is possible to provide a 1-to-1 relationship of waveguides and subpixels; i.e. a light beam leaving a waveguide and guided to a beam shaping structure illuminates only a single subpixel and, vice-versa, each subpixel is illuminated by a light beam arriving at the beam shaping structure from a single waveguide. The beam shaping structure may be shared among multiple subpixels and their respective associated waveguides. Furthermore, the optical device provides for the possibility to provide for further collimated beams originating from the same external light source, since further waveguides can be branched off the first waveguide. Generally, the first waveguide may receive a light beam from an external light source directly or indirectly, e.g. via one or more additional, intermediate waveguides and/or one or more additional, intermediate optical couplers.

The feature that the beam shaping structure is configured to propagate a light beam received from the second waveguide to the light emitting area such that the beam divergence of a light beam emitted from the light emitting area is lower than the beam divergence of the light beam received from the second waveguide implies that the beam divergence along at least one axis of the light beam is reduced. The beam divergence angle is a measure for the increase of the beam width or beam diameter with increasing distance from the beam waist locations and are defined as given in ISO 11146-1 (First edition, 2005 Jan. 15), in particular in section 3.15 of said documentation, for stigmatic and simple astigmatic beams; for general astigmatic beams the respective definition from ISO 11146-2 and ISO 11146-3 is applicable. Optionally, the beam divergence angle is reduced for both principal axes of the beam. The beam divergence angle is reduced by optionally at least 1°, further optionally at least 10°, further optionally at least 20°, for at least one axis, optionally both/all axes, of the light beam. Optionally, the divergence angle is reduced such that the light beam emitted from the light emitting area has a divergence half-angle of less than 10°, further optionally less than 3°, further optionally less than 1°. The divergence angle is reduced such that a spot of the light beam in a distance of 2 cm from the light emitting area (and/or from the optical shaping element mentioned below) has a size with a diameter of optionally less than 2 mm, further optionally less than 500 µm, further optionally less than 100 µm. In particular, the optical device of the present disclosure allows to create spots of less than 20 µm in diameter on the surface of a display and/or on a liquid crystal layer of a display when used in a respective backlight unit, which is smaller than the subpixel pitch of TVs (typically larger than 70 µm) or even smartphones (about 25 µm).

Optionally, the beam shaping structure collimates and/or (re)focuses the light beam. When using the optical device in a backlight of a display, it is thereby possible to create one light beam for each subpixel. Optionally, the first waveguide and/or the second waveguide is/are single-mode waveguides. It is advantageous, if a waveguide core diameter of the first and/or the second waveguide is less than 100 um, optionally between 0.1 and 50 µm, further optionally between 1 and 5 µm.

Optionally, the optical device comprises a number of further waveguides with a corresponding number of further optical couplers for coupling a light beam from the first waveguide to the respective further waveguides, wherein each of the number of further waveguides is configured to guide a light beam coupled from the first waveguide to the beam shaping structure, wherein the beam shaping structure is configured to propagate a light beam received from each of the number of further waveguides to the light emitting area such that the beam divergence of a light beam emitted from the light emitting area is lower than the beam divergence of the light beam received from the respective waveguide. The further optical couplers can also be for coupling a light beam from other waveguides, which other waveguides are directly or indirectly connected to the first waveguide and/or connectable to the external light source and/or connectable to other external light sources. The number of further waveguides is optionally at least 1, further optionally at least 10, further optionally at least 100, further optionally at least 10000, further optionally at least 100000. Thus, there can be one waveguide per subpixel and directional couplers can be used to distribute light from one external light source to hundreds or thousands or millions of pixels. It is further advantageous, if the optical device comprises further waveguides of the type of the first waveguide, for receiving a light beam from the external light source and/or from further external light source. E.g., each external light source can be coupled to at least 1000 further waveguides (of the type of the second waveguide).

Optionally, the light beam arriving at the beam shaping structure from the second waveguide is propagated such that it illuminates only a fraction of the light emitting area.

Optionally, the light beams propagated by the beam shaping structure received from different ones of the further waveguides illuminate non-overlapping sections of the light emitting area and/or the overlap of each two neighbouring sections comprises less than 10% of the energy of the light beams from different waveguides. Optionally, the light emitting area is substantially flat and/or in a plane.

It should be noted that collimated backlights have applications that go beyond what is detailed here. In the nascent technological area of light field displays and holographic displays there is also a need for collimated backlights to enhance image quality.

The present disclosure generally also provides for an alternative embodiment:

Optical device for controlling light and for use in a backlight unit of a display, the optical device comprising:
at least one waveguide;
a beam shaping structure with a light emitting area for emitting a light beam;
wherein the beam shaping structure is suitable for propagating a light beam arriving from one of the waveguides such that the light beam illuminates a single subpixel of a display area of a display. More specifically, there is a 1-to-1 relationship of waveguides and subpixels, as explained with regard to the first embodiment. Each light beam arriving at the beam shaping structure is propagated to a different subpixel, depending on which waveguide it arrived from. The optical device of this alternative embodiment may comprise the features of the optical device as mentioned above, wherein the waveguide of the alternative embodiment corresponds to the second waveguide, and it may comprise any of the optional features listed below. Therefore, the optional embodiments listed below refer to both, the optical device mentioned prior to this paragraph and the optical device mentioned in this paragraph.

In an exemplary embodiment, the beam shaping structure comprises an optical shaping element, wherein the at least second waveguide directs the light beam coupled from the first waveguide at the optical shaping element. Optionally, further waveguides direct the light beam coupled from the respective further waveguide at said optical shaping element. Advantageously, the optical device comprises further optical shaping elements, wherein each of the number of further waveguides guides a light beam to the optical shaping element or one of the further optical shaping elements. The optical shaping element operates on the light beam to reduce the beam divergence when the light beam is propagated from the second waveguide to the light emitting area.

In a more specific exemplary embodiment, the optical shaping element is a concave mirror or a diffractive optical element. This allows for a particularly easy implementation of the optical shaping element and the beam shaping structure comprising the optical shaping element. Optionally, the concave mirror is a micro-mirror. The concave mirror can have a high surface quality, since otherwise the beam quality may suffer and focal spots may get enlarged. The concave mirror can have an arbitrary shape, wherein sharp bends are possible. Optionally, the concave mirror has a bending radius (or bending radii) of between 0.1 mm and 1 mm, further optionally between 0.3 mm and 0.7 mm. It can be used to set the beam diameter as wished at any defined distance, e.g. at any point in a display stack, e.g. in a liquid crystal layer or in a light converting (such as quantum dots or quantum rods) layer of the display. If the optical shaping element is a concave mirror, it is further optional that further waveguides impinge on the same concave mirror. E.g., the maximum number of waveguides impinging on the same mirror can be set to be 25. The concave mirror can for example have a spherical, parabolic or toroidal shape. The optical shaping element, in particular the concave mirror, can e.g. be produced by a roll-to-plate process, which allows a cheap manufacture. Also, precision glass press molding or dry etching are possible manufacturing techniques.

The optical shaping element can have at least a first axis and a second axis, wherein the focal length of the optical element for the first axis is different than for the second axis. The optical shaping element may receive a light beam from the second waveguide from a direction which differs from the direction in which the light beam is emitted/reflected from the optical shaping element, for example light is directed at the optical shaping element in a shallow angle, of e.g. 10-20°. Providing for a different focal length for each axis allows to compensate contortions resulting from such incident angles, thereby e.g. transforming an elliptical beam into a circular beam and, in general, transforming the light beam such that the resulting light beam has more similar beam widths for the different (principal) axes. The first axis is optionally orthogonal to the second axis. If the optical shaping element is a concave mirror, it may have different bending radii in the first and the second axis.

Optionally, the optical shaping element may be provided by a polymer structure. In this way, a high beam quality and a high reflectivity can be achieved. For example, the polymer structure is a UV-nanoimprinted polymer structure. Optionally, the optical shaping element and/or, respectively, the polymer structure comprises a reflective coating (e.g. silver). This allows for a particularly easy implementation of the optical shaping element and low losses. The reflective coating can have a thickness of e.g. between 10 μm and 100 μm.

In an optional embodiment, the optical device comprises a third waveguide and an optical coupler (a second optical coupler) for coupling a light beam from the first waveguide to the third waveguide, wherein the third waveguide is configured to guide a light beam coupled from the first waveguide to the beam shaping structure, wherein the beam shaping structure is configured to propagate a light beam received from the third waveguide to the light emitting area such that the beam divergence of a light beam emitted from the light emitting area is lower than the beam divergence of the light beam received from the third waveguide, wherein the light beam guided by the second waveguide to the beam shaping structure and the light beam guided by the third waveguide to the beam shaping structure are optionally emitted from the light emitting area with substantially parallel central propagation axes (as defined by the beam centroid). Alternatively, the central propagation axes can include small angles and are aligned to impinge on defined (e.g. neighbouring) spots in a certain distance.

Optionally, the optical device may comprise a substrate, wherein the first waveguide and at least the second waveguide are formed within the substrate. The substrate is optionally a transparent substrate, in particular a glass substrate. Advantageously, the substrate comprises borosilicate glass, e.g. Corning® EAGLE XG®, which is an alkaline earth boro-aluminosilicate glass type. The substrate may have a thickness of more than 100 μm, optionally more than 250 μm. The substrate is optionally sheet- or plate-shaped and the substrate's thickness (defined as the substrate's shortest dimension) is optionally at least 10 times, further optionally at least 100 times, further optionally at least 1000 times, lower than the substrate's dimension in both directions normal to the shortest dimension. The substrate has a thickness of optionally less than 5 cm, further optionally less than 2 mm, further optionally less than 1 mm. Optionally, the first waveguide and at least the second waveguide are formed within the substrate by means of direct laser writing, in particular femtosecond direct laser writing. In this way, waveguides can be achieved that have a low propagation loss. E.g., experiments have shown a propagation loss of less than 0.4 dB/cm for blue light (at 450 nm wavelength). Advantageously, by forming the waveguides by means of direct laser writing, it is possible to provide for 3D waveguide trajectories. Thereby, layers of optical shaping elements (in particular mirrors) can be combined with layers of waveguides. Optionally, the first waveguide extends within the substrate substantially orthogonally to the thinnest dimension of the substrate. If the optical shaping structure comprises a polymer, the index of refraction of the polymer should be equal or similar to the index of refraction of the substrate, e.g. with a difference of less than 0.1. In this way, total internal reflection can be avoided. The optical shaping element can be formed by the substrate and/or by an external structure, e.g. adjacent to the substrate. Optionally, the second waveguide and/or the first waveguide emit single mode (Gaussian beam) light, in particular with a high beam quality, wherein the $M^2$ measure is optionally less than 3, further optionally less than 2, further optionally less than 1.5. Thereby, a small spot size can be achieved. Laboratory results have shown that a coupling between single-mode waveguides of more than 95% can be achieved. Optionally, the light emitting area is provided by a surface of the substrate.

Generally, a method for direct laser writing the waveguides in the substrate optionally comprises the following step:
  using a tightly focused laser beam (with e.g. 1 μm width) and moving the substrate to create structures.

Femtosecond direct laser writing (also called femtosecond laser direct-writing or FDLW) can be employed if the optical device is to be used with a high power external light source in the near UV, as may be used with the optical device disclosed herein. FDLW optionally comprises one or more of the following step:
  provide for a substrate, which comprises a transparent dielectric material and/or which comprises glass, ceramic, polymer and/or crystalline material;
  use multiphoton (i.e. more than 2-photon) absorption of photons with energies below the bandgap of the material of the substrate and/or wherein the pulses are femtosecond pulses at low to medium frequencies, e.g. between 20 kHz and 10 MHz, optionally between 80 kHz and 5 MHz in particular between 100 kHz and 2 MHz and even more particularly between 500 kHz and 1.5 MHz, and/or wherein the pulses have a medium pulse width, e.g. between 40 fs and 2 ps, optionally between 100 fs and 1 ps, in particular between 200 fs and 400 fs.

Another technique of laser writing is 2PP (2-photon polymerisation) laser writing, which may comprise two photon lithography or multiphoton lithography. In contrast to femtosecond direct laser writing, it may contain one or more of the following steps or properties:
  use femtosecond pulses at typically high frequencies, e.g. 80 MHz and with low pulse width<100 fs;
  two-photon absorption is a third-order process with respect to the third-order susceptibility and a second-order process with respect to light intensity;
  provide for a special resist (a photosensitive material) that is highly transparent to photons of wavelength lambda but highly absorptive for photons of wavelength lambda/2.

The disclosure further concerns a backlight unit, comprising an optical device as disclosed herein and comprising a light source coupled to the first waveguide. With the present disclosure it is possible to distribute the light from one light source to many pixels (e.g. more than 1000 pixels), in particular while retaining single-mode quality. In particular, it allows to distribute and provide one collimated light beam per subpixel of a display to be illuminated. I.e., a 2D grid of light beams perpendicular to the backlight surface is achievable, wherein the spacing between neighbouring light beams in one direction is e.g. between 30 μm and 500 μm. This corresponds to the typical subpixel pitch of displays. The light source is optionally a laser, in particular a single mode laser diode. The light source optionally has a low $M^2$ measure, e.g. less than 3, further optionally less than 2, further optionally less than 1.5. Thereby, a modest to high coupling efficiency to (in particular single mode) waveguides is achievable. The laser is optionally an edge-emitting and/or vertical cavity emitting laser diode. The coupling of the light beam emitted from the light source to the first waveguide can also be indirect, i.e. via another waveguide or cascade of waveguides. The coupling of a light beam emitted from the light source to the waveguide is optionally achieved using a micro-lens and/or butt-coupling. Laboratory results have shown coupling efficiencies of more than 50%. Optionally, the light source is configured for emitting light with a central wavelength of between 300 and 470 nm, e.g. 450 nm or 405 nm. Optionally, the backlight unit comprises more than one light source. If several light sources are used, each illuminating a certain section of an area, local dimming of the area to be illuminated can be implemented to increase contrasts (or the contrast ratios, equivalently). Also, a full color option is possible with center wavelengths of laser diodes 460 nm, 530 nm and 630 nm.

This disclosure further concerns a display panel (or "display"). There are a few disadvantages of the currently available displays.

One issue concerns the color gamut of LCDs.

The human eye has three different types of "pixels", which allow it to sample the spectrum of the light impinging on it. Depending on the spectral composition of the light impinging on the eye, different "colors" are perceived. This fact is very useful for displays, because they only need to emit light of three different wavelengths to "simulate" all colors. A perfect display would be able to spectrally address each of the eye's "pixels" separately. This can be done by using e.g. laser beams at 400 nm for blue, 700 nm for red and typically 530 nm for green.

LCDs used to date do not use laser diodes, but most often LEDs with yellow phosphor on top of it, which creates a continuous spectral emission across the visible spectrum. Color filters are then used to "cut-out" blue, green and red parts of that spectrum. This leads to very broad spectra for each color, meaning that e.g. a red subpixel will also emit significant "green" light, which is called color cross-talk. Color cross-talk limits the range of colors that can be displayed, e.g. there is no clean red, only a yellowish-greenish red.

Quantum dots address this problem by doing a much better job than the yellow phosphor: they absorb the blue light and emit it in distinct peaks at the desired wavelengths. Still not as sharp as lasers but with e.g. 30 nm spectral width already much better than the phosphor. To date, quantum dots are used in the backlight of televisions sold by e.g. Samsung® branded QLED. In such a backlight, the light from blue LEDs is distributed over the whole display array before impinging on a thin film of quantum dots ("Quantum Dot Enhancement Film" or QDEF). In the film, the red and green quantum dots absorb part of the blue light and convert it to red and green light, creating—together with the blue LED—a mixture of RGB light overall the film plate. The color filters then select only light of their color for the respective subpixel and reflect the rest.

Another issue is the optical efficiency of LCDs.

To generate e.g. red light for the red subpixel, a color filter has to be used that blocks all light that is non-red, meaning that for a standard white backlight at least 66% of the light is lost. Typically, the loss is significantly higher because the spectrum of the light does not fit well the transmission spectrum of the filters. Additional filters have to be used to polarize the light before entering the liquid crystal structure, introducing another loss of ca. 30%. Finally, the black boundaries separating the subpixels absorb ca. 33% of light. Taking all this into account, typically more than 90% of light generated in the backlight is lost and never reaches the viewer, leading to high power consumption and heat generation in the display relative to the achieved brightness of the display.

By using QDEF in LCDs, the efficiency is only slightly improved with respect to standard LED-based LCDs, since the main losses related to the 3-individual color filters, the polarization and the black boundaries of the liquid crystal grid are still present. It should be noted, that the energy efficiency of OLED displays (second major technology for displays in use nowadays) is roughly on par with current LCD technology.

In recent years, a more efficient way of using quantum dots in LCDs compared to QDEF has been proposed: positioning the quantum dots after the "shutter" part of the LCD in order to act as specific-color convertors and replacement of color filters. This approach is called quantum dot color filter replacement (QDCFR). To this end, only green quantum dots are positioned at the green subpixel position and the same for the red color. In this way, a blue backlight emits blue light, which passes through the "shutter" without color filtering, meaning a significant decrease in optical losses.

The advantages of QDCFR over QDEF are:
higher energy efficiency because no color filters are used in the LCD;
very good viewing angle and same contrast ratio at all viewing angles because of uniform scattering angles of QDs;
only one type of LCD cell (blue);
lower price and likely enhanced contrast ratio;
blue LC cells also have typically fastest switching time.

Still, QDCFR encounters at least two conceptual design problems regarding the backlight unit.

One problem is subpixel cross-talk.

Light rays that pass through the "shutter", for e.g. a green subpixel, should only hit the quantum dots for this very subpixel. This is difficult to achieve, if the propagation distance between shutter and quantum dots is large and the angle of the rays large. In a typical display stack, the distance between a liquid crystal cell and the quantum dots is on the order of 700 μm. Even for a collimated backlight with a cone opening half-angle of only 10°, something which is not commercially available and would most likely lead to substantial additional optical losses, subpixel cross-talk often cannot be avoided. The only possible solutions are to make very large pixels, which is undesirable, decrease the aperture size of the liquid crystal, which leads to large energy efficiency drops or to use a high collimated (e.g. less than 1° beam divergence angle) backlight, something that has not been achievable so far.

Alternatively, the display stack can also be changed: by moving the top polarizer into the liquid crystal cell ("in-cell" polarizer), the quantum dots can be placed where the color filters are positioned in a standard layout, which is at the liquid crystal position. In this layout subpixel cross-talk can be sufficiently suppressed. The problem with this approach is that it is hard to make functional in-cell polarizers and no mass-market producible product has yet been released that features them.

A further problem of QDCFR is the contrast ratio decrease, which also cannot be overcome by using in-cell polarizers.

Even if a high contrast ratio in-cell polarizer were available, the contrast ratio of a QDCFR display can be significantly lower than a standard LCD display. The reason for this is that, since quantum dots are uniform scatterers over 360° angle directions, rays propagating through the LCD at oblique angles will be converted to new rays at random angles, some of them at normal angle. This means that a ray at oblique angle (before hitting the QDCFR), that shows poor contrast ratio and would normally be only visible if the display is viewed at an angle (when using QDEF or standard LED-BLU), can now also be seen if the display is viewed at normal angle.

Thus, while quantum dots provide the same contrast ratio at all viewing angles, since they are uniform scatterers the contrast ratio of the QDCFR LCD is averaged over all viewing angles. This can decrease the contrast ratio when viewed at normal angle from 1:3000 to 1:130 (see e.g.: Han, S., Kiselev, F. D. and Mlejnek, M. (2019), 75-2: Quantum Dots on Color Filter LCD Design Study. SID Symposium Digest of Technical Papers, 50: 1067-1070.).

It is a further object of the present disclosure, to resolve or alleviate at least some of the problems of the prior art displays. In particular, it is an object of the present invention to provide a display, which is more efficient, has a better color gamut and/or a higher contrast ratio and/or a better viewing angle.

A display panel comprising a backlight unit as described in this disclosure is proposed. Such a display can achieve an illumination with collimated light, alleviating one or more of the problems mentioned above. In particular, in QDCFR, the subpixel cross-talk problem can be solved and no in-cell polarizer is necessary to avoid subpixel cross-talk (of course an in-cell polarizer can still be used, e.g. to make the display stack more compact). Furthermore, in QDCFR, also the contrast ratio decrease issue is solved, since only rays at normal angle pass through the liquid crystal cell and maximum contrast ratio is achieved. However, the advantages are not limited to QDCFR display. In contrast, the efficiency can be increased in backlit displays in general. The efficiency over conventional displays can further be increased, since total internal reflection at a cover material of the display panel, e.g. glass, resulting in low output extraction efficiency can be averted (see e.g.: Han, S., Kiselev, F. D. and Mlejnek, M. (2019), 75-2: Quantum Dots on Color Filter LCD Design Study. SID Symposium Digest of Technical Papers, 50: 1067-1070). With the present disclosure, the cover material could be exchanged with any other polymer.

Furthermore, the present disclosure allows to achieve a small beam diameter. This ensures that the black boundaries usually separating the subpixels are not hit, which means that a loss of 30-50% can be avoided. This results in a strong increase in transmission.

To increase the contrast ratio via local dimming, two LC layers can be stacked on top of each other. Again, the transmission can be increased, because no boundaries are hit. Furthermore, the Moiré problem, that can occur if the LC grids are stacked on top of each other due to misalignment of two grids, can be solved. Since the beam can be made much smaller than the aperture of each individual subpixel, there is sufficient lateral alignment tolerance between the two LCDs (e.g. +−20 μm).

Furthermore, for QD displays, a lowered material use of quantum dots is achievable, since spot sizes of less than 20 μm times 20 μm can be reached at the position of the quantum dots. For present TVs, subpixel sizes can reach 300×100 μm, which normally are uniformly covered with quantum dots. Covering only a 20×20 μm area instead of a 300×100 μm area leads to a quantum dot material saving of ca. 98.7%. Potentially, this reduction could even allow the use Cadmium (Cd)-based quantum dots despite stringent RoHS requirements. Cd-quantum dots have better performance than indium phosphide ones but the latter are not RoHS limited.

The display panel is optionally a flat-panel display. Optionally, the display panel is a liquid crystal display, further optionally a quantum dot display. Optionally, the light beam from the second waveguide emitted from the beam shaping structure illuminates one subpixel, and/or the liquid crystal (LC) area associated with one subpixel and/or the quantum dot area associated with one subpixel. Optionally, the further waveguides of the type of the second waveguide are each associated with one subpixel, wherein the associated subpixel is different for different waveguides.

The display panel optionally comprises one or more of:
- a first polarizer,
- a TFT (Thin-film-transistor) glass,
- a cover glass,
- a second polarizer (usually called "analyser") and/or an in-cell polarizer,
- a layer comprising light converting structures (see below),
- a color filter for blocking pump light and reflecting ambient light which can lead to unwanted excitations of the light converting structures,
- a glass layer protection.

In an optional embodiment, the display panel comprises at least a first type of light converting structure, which optionally comprises a first type of quantum dots or quantum rods, for converting a light beam emitted from the light source into a first color range, wherein the beam shaping structure is configured such that the light beam guided to the beam shaping structure from the second waveguide and emitted from the light emitting area impinges on a light converting structure of the first type, which light converting structure is associated with a first color subpixel of the display panel. Optionally, the light converting structure of the first type comprises phosphor. In particular, the light source provides a pump beam for the light converting structure.

Optionally, the display panel comprises at least a second type of light converting structure, which optionally comprises a second type of quantum dots or quantum rods, for converting a light beam emitted from the external light source into a second color range different from the first color range, wherein the beam shaping structure is configured such that the light beam guided to the beam shaping structure from the third waveguide and emitted from the light emitting area impinges on a light converting structure of the second type, which light converting structure is associated with a second color subpixel of the display panel, wherein the second color subpixel is optionally neighbouring the first color subpixel. In effect, thus, the first and the second color subpixels can display different colors. Optionally, two, three, four, or more (color) subpixels can form a pixel.

Often, in QDCFR no blue QDs are used. Instead, a blue LED at e.g. 450 nm is used both to pump red and green QDs as well as providing the blue light. In this case, normally some transparent scattering structures are used to diffuse the blue light and ensure that there is no angle dependent color shift. Such a setting can also be used for the current disclosure. However, due to the coherence of the light beams, this could lead to speckles. Therefore, it is advantageous to either use a lens or diffractive optical element to diffuse the beam (which does not impinge on QDs). Alternatively and optionally, also a third type of light converting structure (optionally quantum dots or quantum rods) is used as diffusers and the pump wavelength is set to be sufficiently shorter (even UV) than the third type of light converting structure's emission wavelength. Optionally, the display panel comprises at least a third type of light converting structure, which optionally comprises a third type of quantum dots or quantum rods, for converting a light beam emitted from the external light source into a third color range different from the first and the second color range and the external light source is configured to emit a light beam with a central wavelength which is shorter than a central wavelength of the first, the second and the third color range. Optionally, the light source emits light in the UV spectrum (e.g. 400 nm or less). Since the human eye has a sensitivity of 1/100th at 400 nm compared to 450 nm, it would be possible to omit an optical filter that blocks the "pump" light, simplifying the display stack. Also, some quantum dots have a significantly higher absorption rate in the UV than at 450 nm.

The first and/or the second and/or the third color range may each e.g. be one of the ranges between:
- 380 and 495 nm; or
- 495 and 580 nm; or
- 580 and 800 nm.

The first and the second and the third color range are optionally non-overlapping. The first and/or the second and/or the third color range may each e.g. have a central wavelength of one of:
- 400 nm; or
- 530 nm; or
- 700 nm.

Optionally, the display panel comprises a fourth type of light converting structure, which optionally comprises a fourth type of quantum dots or quantum rods, for converting a light beam emitted from the external light source into a fourth color range different from the first, the second and the third color range.

Optionally, the light converting structure associated with the first color subpixel and the light converting structure associated with the second color subpixel are separated by a boundary comprising a material which is substantially opaque to at least a central wavelength of the first color range and/or a central wavelength of the second color range. Thus, cross excitations between light converting structures associated with different subpixels can be prevented. Optionally, the boundary blocks at least 90% of the intensity of light with a central wavelength of the first color range and the second color range.

Optionally, the optical device comprises at least a further waveguide and a further optical coupler for coupling a light beam from the first waveguide to the further waveguide,
- wherein the further waveguide guides the light beam emitted from the external light source to the beam shaping structure and the beam shaping structure is also configured such that the beam divergence of a light beam emitted from the light emitting area is lower than that of the light beam guided to the beam shaping structure by the further waveguide,
- wherein the beam shaping structure is configured such that the light beam guided to the beam shaping structure from the further waveguide and emitted from the light emitting area impinges on an optical diffusing element associated with a third color subpixel of the display panel. In this embodiment, one of the colors to be displayed by the display panel may optionally be the color emitted by the light source. Due to the optical diffusing element, the viewing angle can be improved.

Optionally, the light converting structure associated with the first color subpixel and the light converting structure associated with the second color subpixel are provided in a light conversion layer, wherein there is provided for a filter layer, in particular a short-pass filter layer, wherein a light beam emitted from the light emitting area passes through the filter layer before reaching the light conversion layer, wherein the filter layer has a higher reflectivity for a central wavelength of a light beam, which the external light source is configured to emit, than for a central wavelength of the first color range and optionally also the second color range. Thereby, pump light from the light source can be transmitted to the light converting structures, but light emitted from the light converting structures can be reflected. Thus, the efficiency is improved.

BRIEF DESCRIPTION OF THE DRAWINGS

By way of example, the disclosure is further explained with respect to some selected embodiments shown in the drawings. However, these embodiments shall not be considered limiting for the disclosure.

FIG. 3 schematically shows a sectional view of a display panel according to the present disclosure.

FIG. 4 schematically shows a top view of a backlight unit of the display panel of FIG. 3.

DESCRIPTION OF EXAMPLE EMBODIMENTS

Figure 1:
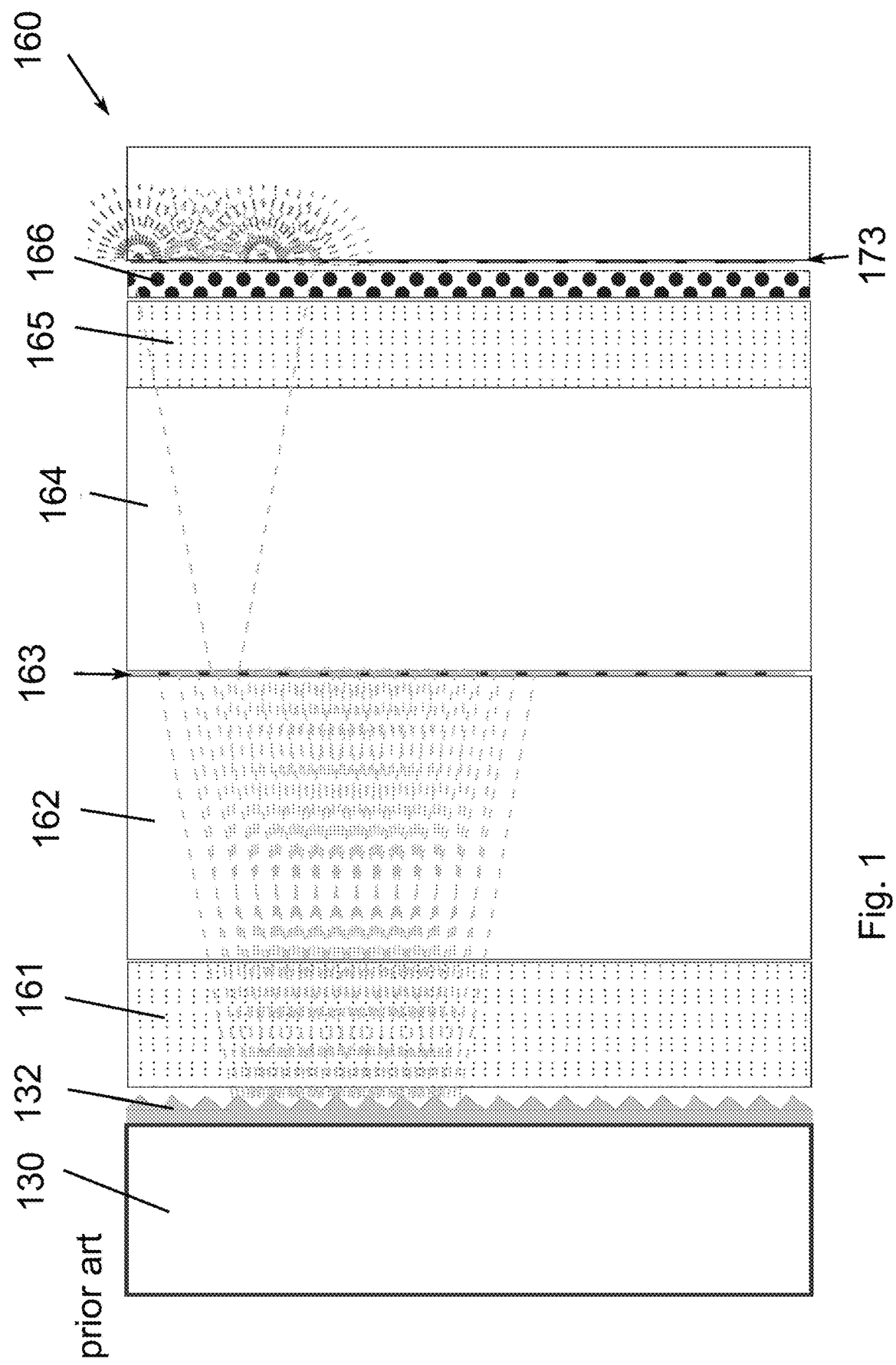
FIG. 1 schematically shows a sectional view of a prior art QDCFR display.

FIG. 1 shows the layers and light beams in a prior art display panel 160, which is a QDCFR display with standard polarizer layers. The display panel 160 comprises a backlight unit 130 with a brightness enhancement film 132. The backlight unit 130 emits light beams with a half-angle of approximately 10°. Subsequently, there is provided for a first polarizer 161 and a TFT glass 162 with a layer 163 of LC cells on top. The light beams which passed through a single one of the LC cells is shown on the right of the LC layer 163. This light beam first passes through the cover glass 164, through second polarizer 165 and a low pass filter 166 (for reflecting QD light but passing pump light), before impinging on a layer 173 with quantum dots for different colors and color subpixels of the display panel 160. As can be seen from the light beam exiting a single LC cell, this light beam reaches several subpixels, leading to subpixel cross-talk and contrast ratio decrease.

Figure 2:
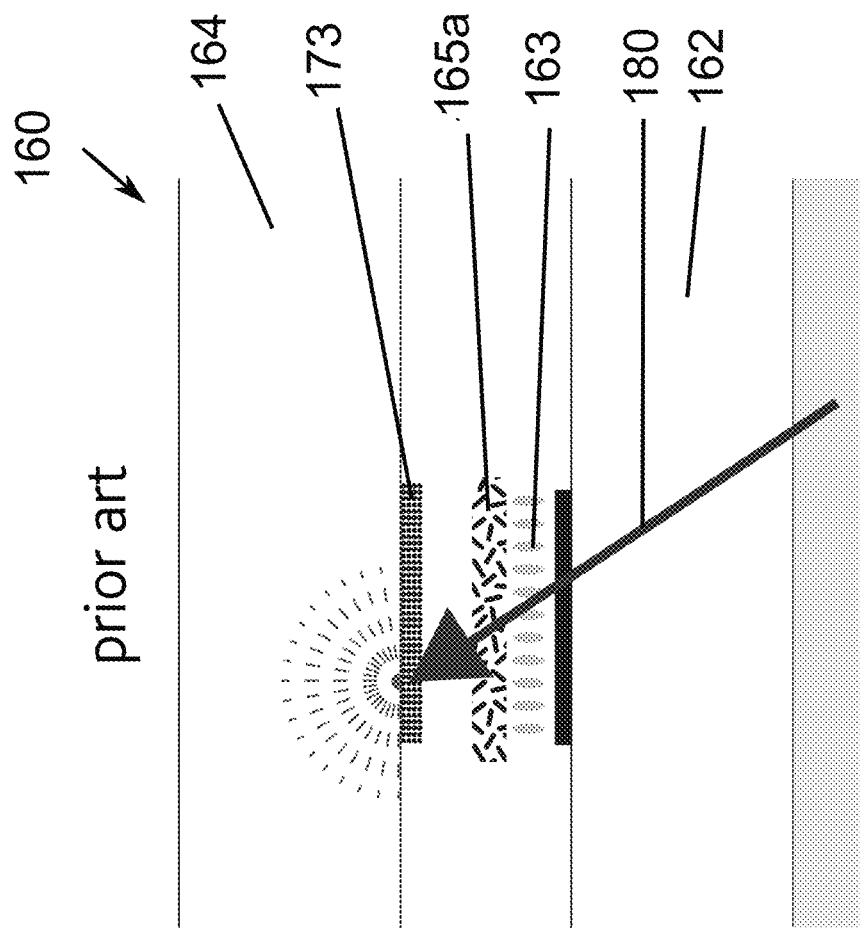
FIG. 2 schematically shows a detail sectional view of the prior art QDCFR display.

FIG. 2 schematically shows a detail of a prior art QDCFR display 160 and illustrates a problem, which cannot be overcome in prior art displays even when using in-cell polarizers. The in-cell polarizer 165a is in the same layer as the liquid crystal layer 163 (or more precisely: contiguous to the LC cells) and the layer 173 containing the quantum dots. These are sandwiched between two glass layers 162, 164. A ray coming from the backlight is shown as an arrow 180. It comes from the backlight at an oblique angle and produces a non-ideal contrast ratio at the display output, if quantum dots are used to scatter these rays uniformly in all directions (i.e. the QDCFR case). This is due to the different path length of rays through the liquid crystal 163 and the birefringence axis of the liquid crystal cell seen by the ray at oblique angles compared to rays at normal angles. Therefore, the contrast ratio when viewing the display 160 at normal angle is diminished.

FIG. 3 shows a display panel 60 according to the present disclosure. The display panel 60 comprises a backlight unit 30. The backlight unit 30 comprises an optical device 1 for controlling light. The optical device 1 comprises a first waveguide 2 for receiving a light beam from an external light source. In this case, the external light source is provided by the light source 31 of the backlight unit 30. The light source 31 is for example a laser diode. The first waveguide 2 is connected to a second waveguide 3 by an optical coupler 4 for coupling a light beam from the first waveguide 2 to the second waveguide 3. The optical device 1 comprises a beam shaping structure 5 with a light emitting area 6 for emitting a light beam. The second waveguide 3 is configured to guide a light beam coupled from the first waveguide 2 to the beam shaping structure 5. The beam shaping structure 5 is configured to propagate a light beam received from the second waveguide 3 to the light emitting area 6 such that the beam divergence of a light beam emitted from the light emitting area 6 is lower than the beam divergence of the light beam received from the second waveguide 3. In particular, the beam divergence angle is lower.

The beam shaping structure 5 comprises an optical shaping element 7. The second waveguide 3 directs the light beam coupled from the first waveguide 2 at the optical shaping element 7. In this embodiment, the optical shaping element 7 is a concave mirror. The optical shaping element 7 is provided by a polymer structure 8. Optionally, the optical shaping element 7 was produced in the polymer structure 8 by UV nanoimprinting.

Furthermore, the optical device 1 comprises a third waveguide 9 and an optical coupler 10 for coupling a light beam from the first waveguide 2 to the third waveguide 9. The third waveguide 9 is configured to guide a light beam coupled from the first waveguide 2 to the beam shaping structure 5, wherein the beam shaping structure 5 is configured to propagate a light beam received from the third waveguide 9 to the light emitting area 6 such that the beam divergence of a light beam emitted from the light emitting area 6 is lower than the beam divergence of the light beam received from the third waveguide 9. The light beam guided by the second waveguide 3 to the beam shaping structure 5 and the light beam guided by the third waveguide 9 to the beam shaping structure 5 are emitted from the light emitting area 6 with substantially parallel central propagation axes. Similar to the second waveguide 3 and the third waveguide 9, the optical device 1 comprises further waveguides.

The optical device 1 comprises a substrate 11. The first waveguide 2, the second waveguide 3 and the third waveguide 9 are formed within the substrate 11. The substrate 11 can be considered the backlight glass.

FIG. 4 is a top view of the backlight unit 30. This figure illustrates, how a fan-out to a 2D grid is achieved. There is provided for a primary fan-out waveguide 12. Via optical couplers, light is coupled from the primary fan-out waveguide 12 to four secondary fan-out waveguides 13. Each of the primary fan-out waveguide 12 and the secondary fan-out waveguides 13 may form a first waveguide 2 in the meaning of this disclosure. From each of the primary and secondary fan-out waveguides 12, 13, optical couplers may couple light out to second and third waveguides 3, 9, and further waveguides of their kind, which direct light at the beam shaping structure 5 (see FIG. 3). Of course, it is possible that only some of the primary and/or secondary fan-out waveguides 12, 13 serve as first waveguides 2. In this way, a 2D grid of collimated light beams can be emitted from the front surface of the backlight unit 30. The emitted light beams are optionally parallel or close to parallel to one another. Furthermore, the backlight unit 30 may comprise further light sources 31, wherein there is provided for further fan-out layouts as described above. Thus, a plurality of light sources can each provide a 2D sub-grid of collimated light beams, together covering a larger area. Therefore, with one or more light source 31, a backlight unit 30 is achieved which emits a grid of collimated light beams.

As can be seen from FIG. 3 again, the display panel 60 comprises a first polarizer 61, through which the light beams emitted by the backlight unit 30 pass. Subsequently, there can be provided for a TFT glass 62. Subsequently, the light beams pass a liquid crystal layer 63, which is followed by a TFT cover glass 64. In general, it is possible to provide the display panel 60 with any LCD stack as is known in the art. This is followed by a second polarizer 65 and a filter layer 66, which will be explained in more detail below.

The display panel 60 comprises at least a first type of light converting structure 67 for converting a light beam emitted from the light source 31 into a first color range, wherein the beam shaping structure 5 is configured such that the light beam guided to the beam shaping structure 5 from the second waveguide 3 and emitted from the light emitting area 6 impinges on a light converting structure 67 of the first type. Said light converting structure 67 is associated with a first color subpixel 68 of the display panel 60. The relative position of the color subpixel 68 and further color subpixels mentioned below is also schematically indicated in FIG. 4.

The display panel 60 further comprises a second type of light converting structure 69 for converting a light beam emitted from the external light source 31 into a second color range different from the first color range, wherein the beam shaping structure 5 is configured such that the light beam guided to the beam shaping structure 5 from the third waveguide 9 and emitted from the light emitting area 6 impinges on a light converting structure 69 of the second type. The light converting structure 69 is associated with a second color subpixel 70 of the display panel 60. As can be seen from FIGS. 3 and 4, the second color subpixel 70 is neighbouring the first color subpixel 68.

The display panel 60 comprises a third type of light converting structure 71 for converting a light beam emitted from the external light source 31 into a third color range different from the first and the second color range. The light source 31 is configured to emit a light beam with a central wavelength which is shorter than a central wavelength of the first, the second and the third color range. E.g., the light source 31 may emit UV light. Thereby, light which passes the light converting structures 67, 69, 71 without conversion does not reduce the quality of a picture displayed by the display panel 60. The pump wavelength of the light converting structures 67, 69, 71 is adapted to the light emitted by the light source 31.

The light converting structures 67, 69, 71 of the first, second and third type comprise, respectively, a first, second or third type of quantum dots in this embodiment. Of course, other embodiments of the light converting structures 67, 69, 71 are possible.

The light converting structure 67 associated with the first color subpixel 68 and the light converting structure 69 associated with the second color subpixel 70 are separated by a boundary 72, comprising a material which is substantially opaque to at least a central wavelength of the first color range and a central wavelength of the second color range. Thus cross-excitations between the light converting structures 67, 69 associated with the first color subpixel 68 and the second color subpixel 70 can be prevented.

The light converting structure 67 associated with the first color subpixel 68 and the light converting structure 69 associated with the second color subpixel 70 are provided in a light conversion layer 73. The light conversion layer 73 is adjacent to the filter layer 66. A light beam emitted from the light emitting area 6 passes through the filter layer 66 before reaching the light conversion layer 73. The filter layer 66 has a lower reflectivity for a central wavelength of a light beam which the light source 31 is configured to emit than for a central wavelength of the first color range and the second color range. Thus, light from the light source 31 can pass the filter layer 66 to the light conversion layer 73, while light emitted backwards from the light converting structures 67, 69 is reflected to a front surface of the display panel 60, i.e. in the direction of a viewer. On top of the light conversion layer 73, the display panel 60 comprises a color filter layer 74. The color filter layer 74 blocks light from the light source 31, which was not converted, from being emitted from the display panel 60 and reflects ambient light which could otherwise lead to unwanted excitations of the light converting structure 67, 69, 71. A glass layer 75 is provided on top of the color filter layer 74 for protection of the subjacent structures.

Figure 5:
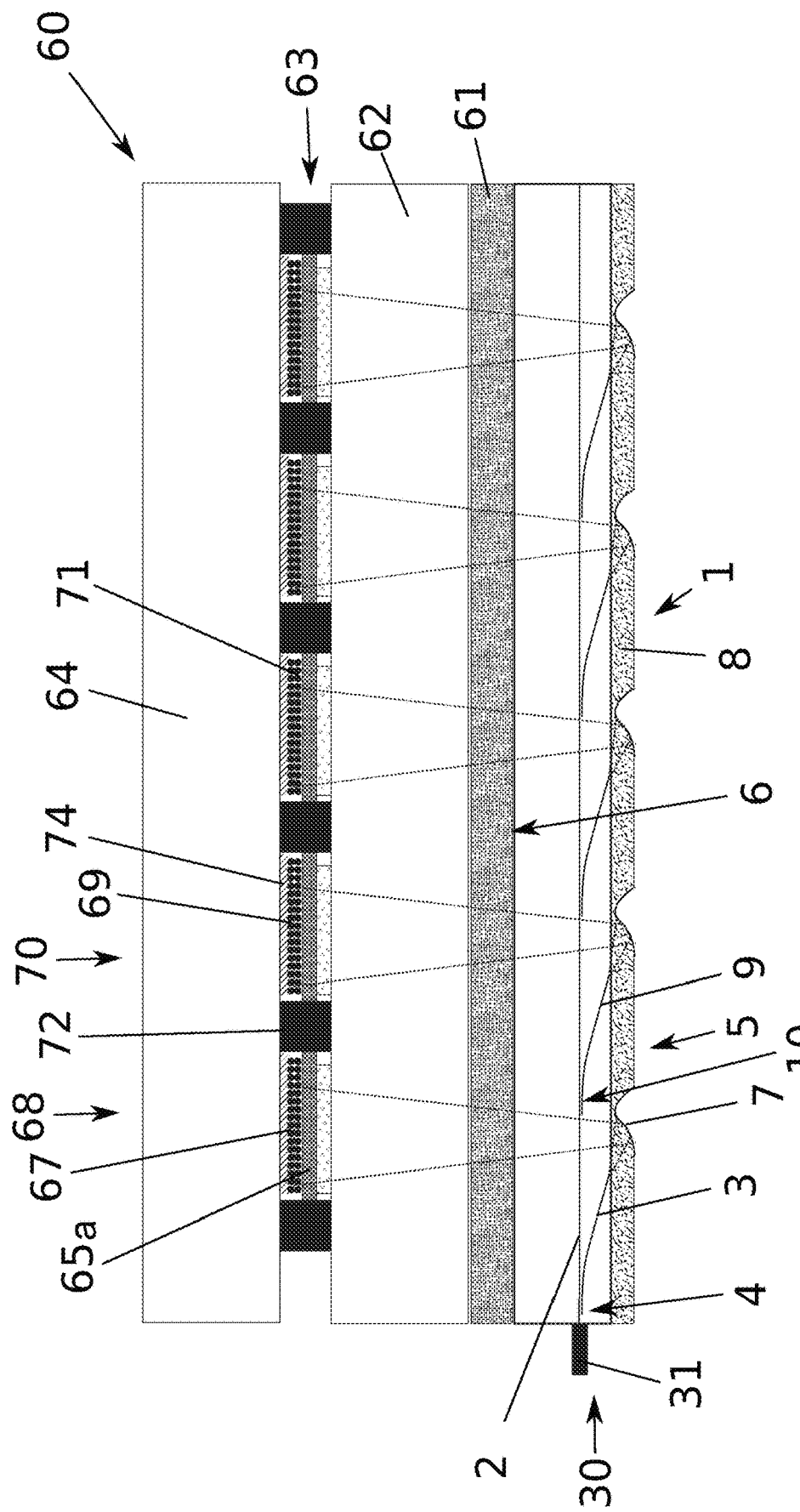
FIG. 5 schematically shows a sectional view of a display panel according to the present disclosure with an in-cell polarizer.

The embodiment of the display panel 60 shown in FIG. 5 is similar to the one shown in FIG. 3. In particular, the backlight unit 30 is the same as in FIG. 3. The display unit 60 comprises a first polarizer 61 and a TFT glass 62. However, the second polarizer 65a is provided as an in-cell polarizer, as part of the LC layer 63 (or more precisely: contiguous to the LC cells). Furthermore, the light converting structures 67, 69, 71 are also provided in-cell with the LC layer 63. This has the advantage that a more compact design can be achieved. The TFT cover glass 64 is provided on top of the LC layer 63.

Figure 6:
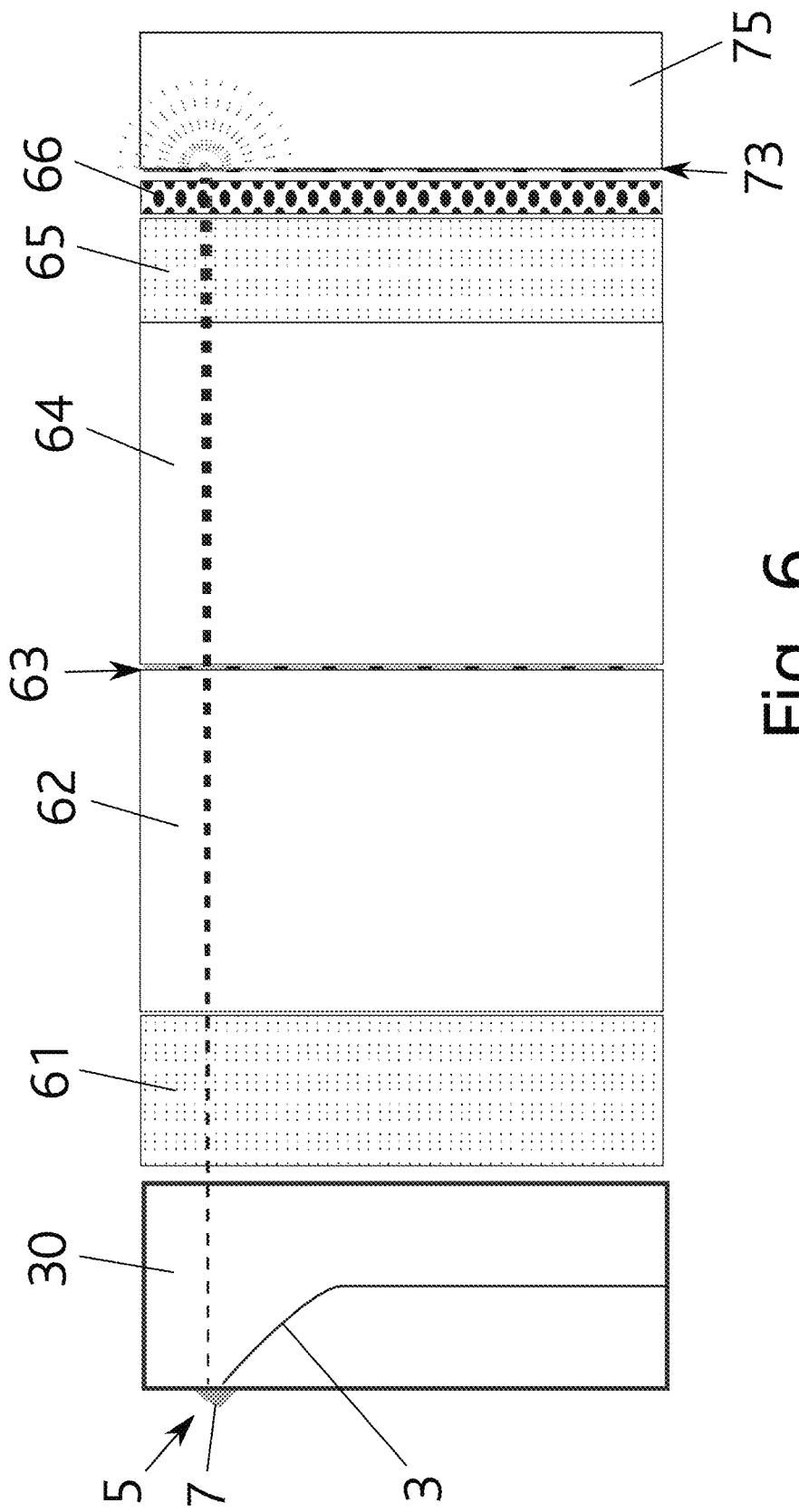
FIG. 6 schematically shows a sectional view of a display panel according to the present disclosure and illustrates the advantage over a prior art display according to FIG. 1.

FIG. 6 schematically shows a side view of a display panel 60 according to the present disclosure and illustrates the advantage over the prior art display 160 shown in FIG. 1. The display panel 60 comprises the backlight unit 30, wherein the light source and the first waveguide are not shown. Subsequently, there is provided for a first polarizer 61 and a TFT glass 62 with a layer 63 of LC cells on top of the TFT glass 62 (which is illustrated on the right-hand side of the TFT glass in FIG. 6). The light beam emitted from the optical shaping element 7 of the beam shaping structure 5 is shown, which passes through a single LC cell of layer 63. This light beam first passes through the cover glass 64, through second polarizer 65 and a low pass filter 66 (for reflecting QD light but passing pump light), before impinging on a layer 73 with quantum dots for different colors and color subpixels of the display panel 60. As can be seen, due to the reduction of the divergence angle by the beam shaping structure 5 (of which only the optical shaping element 7 is shown), the light beam passing through one LC cell impinges only on the quantum dots associated with one subpixel. Therefore, there is no subpixel cross-talk and no contrast ratio reduction. On top, there is provided for a glass layer 75.

Figure 7:
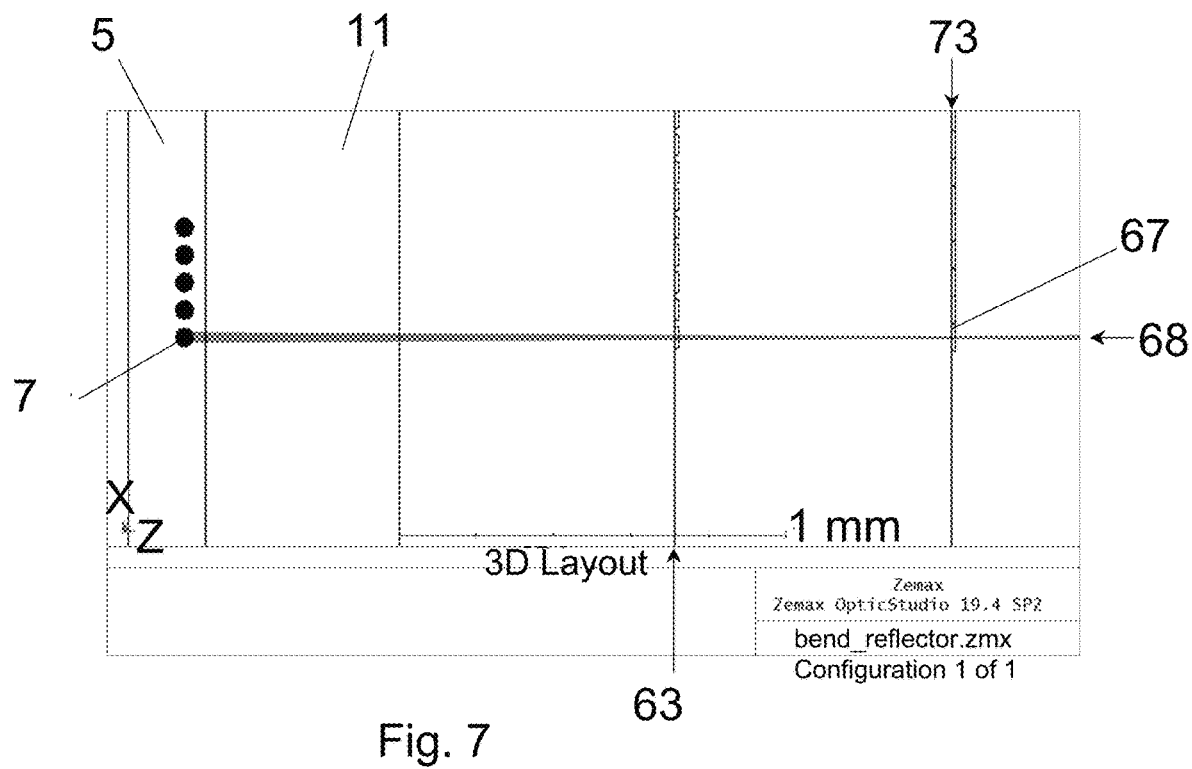
FIG. 7 shows the X-Z-plane of a Zemax® simulation demonstrating the reduction of the divergence angle.
Figure 8:
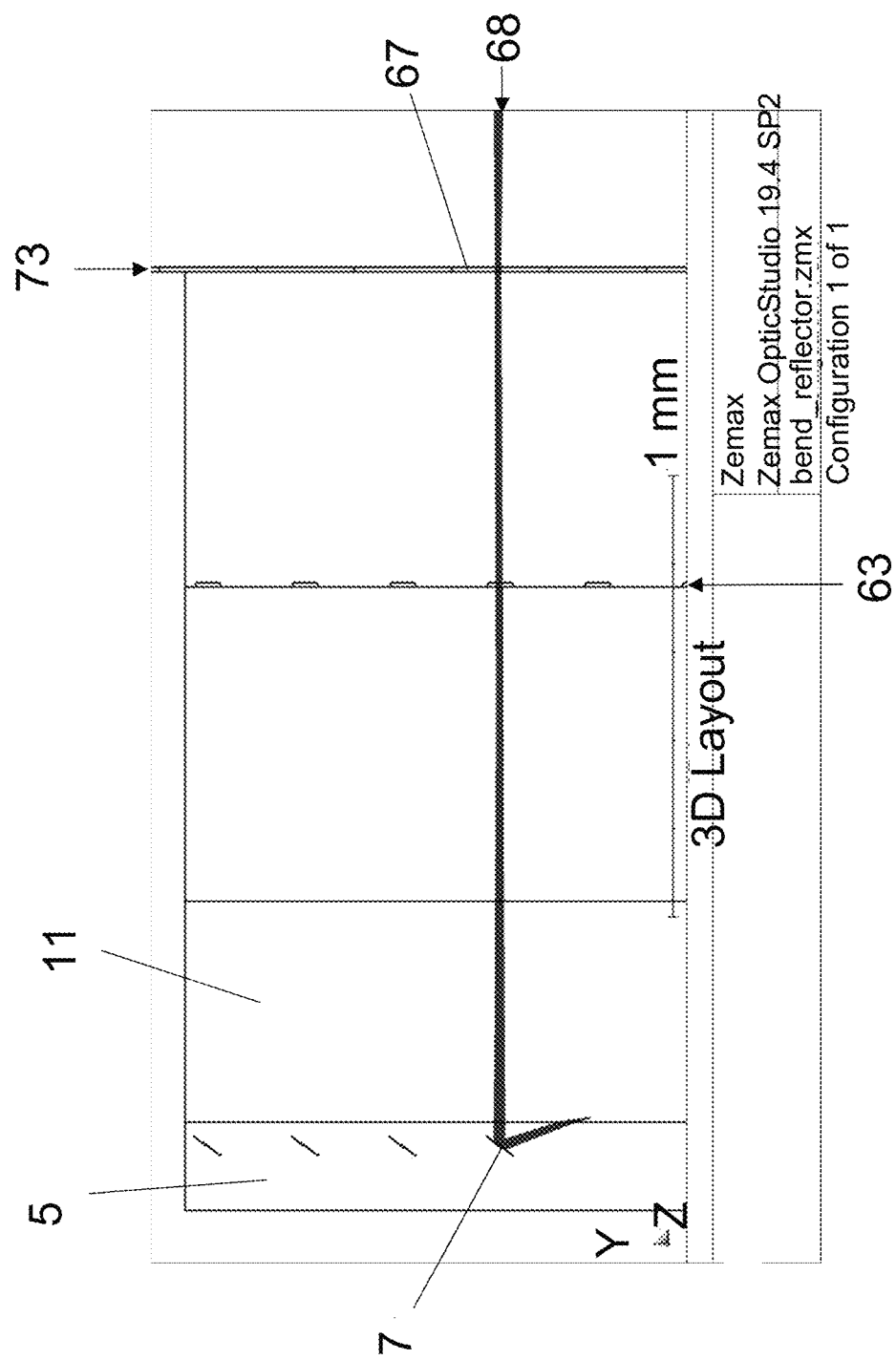
FIG. 8 shows the Y-Z-plane of the same simulation as FIG. 7.

FIGS. 7 and 8 show a Zemax® simulation, wherein FIG. 7 shows the X-Z-plane and FIG. 8 shows the Y-Z-plane. For this simulation it is assumed that the second waveguide 3 (not visible) is bent towards the optical shaping element 7 at an angle of 12°. The waveguide is provided in substrate 11, and the beam shaping structure 5 with the optical shaping element 7 is provided in contact with the substrate 11. The second waveguide's 2 tip ends 10 μm above the interface of the substrate 11 and the beam shaping structure 5 and the second waveguide 2 emits a light cone with an opening half-angle of 3.5°. The optical shaping element 7 is provided as a concave mirror with bending radii of 0.32 mm and 0.65 mm in different axes orthogonal to one another. The shown light beam passes through a cell of the LC layer 63 and is substantially focused on the light converting structure 67 of the first type associated with the first color subpixel 68. The light converting structure 67 is provided in the light conversion layer 73. The simulation shows that a spot size of the light beam at the light conversion layer 73 of 4 μm times 10 μm is achievable. The pixel pitch for this simulation is 220 μm, the LCD subpixel aperture is set to 58 μm times 58 μm and the QD layer pixel aperture is set to 220 μm times 73 μm.

Figure 9:
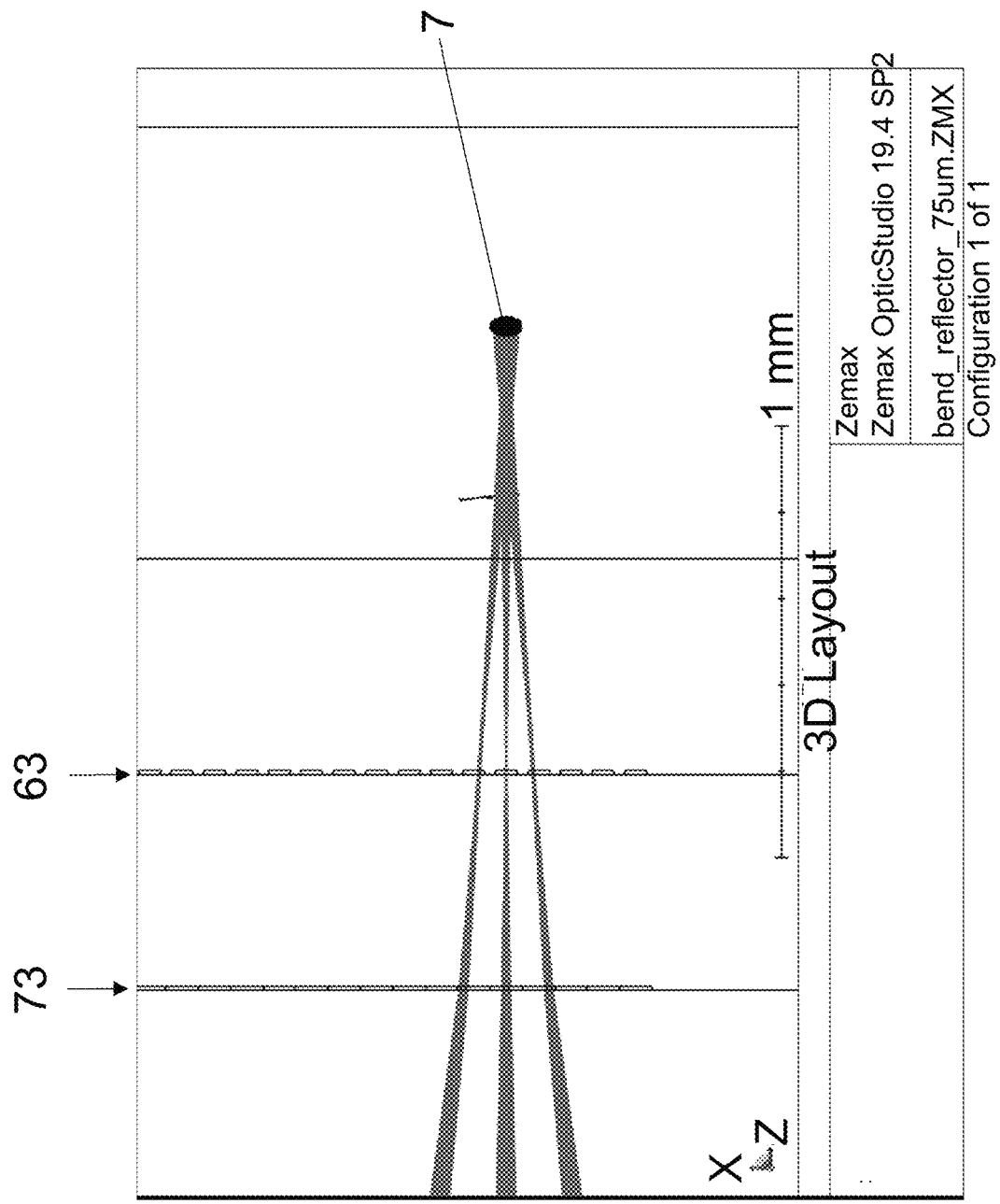
FIG. 9 shows the X-Z-plane another Zemax® simulation, wherein several waveguides of the type of the second waveguide impinge on the same optical shaping element.
Figure 10:
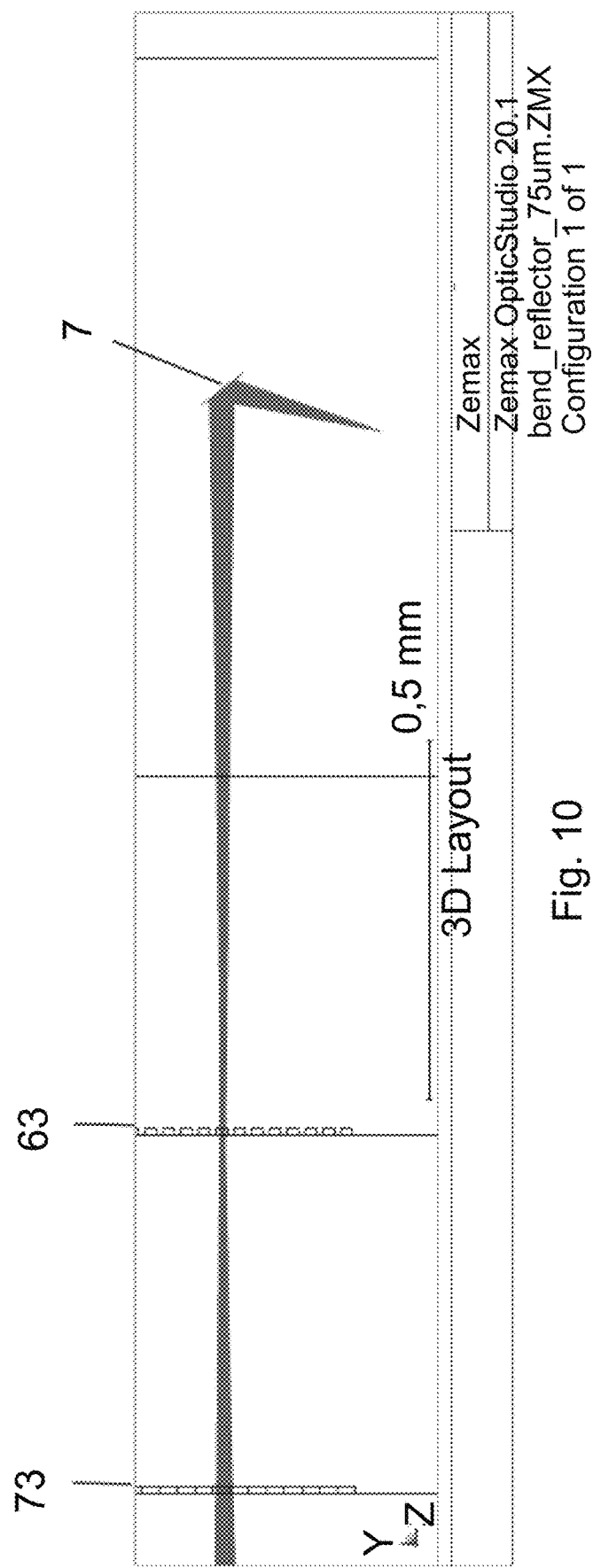
FIG. 10 shows the Y-Z-plane of the same simulation as FIG. 9.
Figure 11:
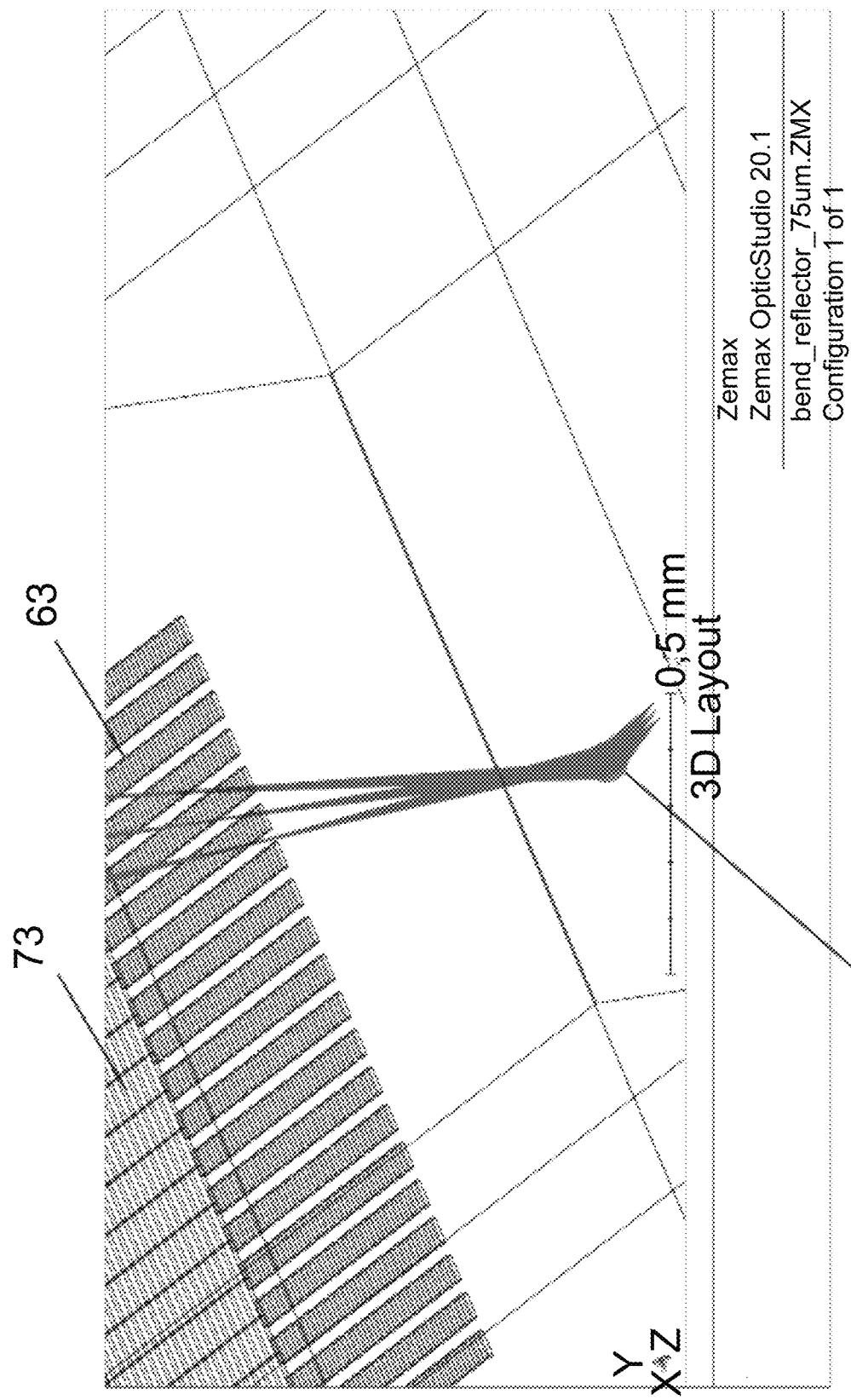
FIG. 11 shows the X-Y-plane of the same simulation as FIG. 9.

FIGS. 9 to 11 show another Zemax® simulation, wherein FIG. 9 shows the X-Z-plane, FIG. 10 shows the Y-Z-plane and FIG. 11 shows the X-Y-plane. Therein, three waveguides (not shown) of the type of the second waveguide 3 impinge on the same optical shaping element 7 and the resulting light beams are shown. The parameters are substantially the same as for the simulation shown in FIGS. 7 and 8. In particular, the angles of the tip of each of the waveguides is the same as for the waveguide in FIG. 7. I.e., the three waveguide all have the same angle and lie on the same tilted plane, parallel to each other. However, the spacing of the waveguides from the optical shaping element 7 is changed to 14 μm, and the spacing between the middle waveguide and each of the two neighbouring waveguides is 14 μm for both cases. The design is made for a 75 μm pixel pitch, i.e. a 25 μm sub-pixel pitch. The optical shaping element 7 is, again, provided as a concave mirror and the mirror's bending radii are 0.3 mm for the x-direction and 0.48 mm for the y-direction. The mirror has an angle of 37.6° with respect to an extension plane of the LC layer 63 and/or the light conversion layer 73, and more generally, a display surface of the display panel 60. As can be seen from this figure, the light beam emitted from each of the three waveguides is directed by the optical shaping element 7 at one of three neighbouring cells of the LC layer 63 and at one of three neighbouring light converting structures in the light conversion layer 73, each associated with a different color subpixel. Thus, an easier setting can be achieved.

The invention claimed is:

1. An optical device for controlling light, the optical device comprising:
   a first waveguide for receiving a light beam from an external light source,
   at least a second waveguide,
   an optical coupler for coupling a light beam from the first waveguide to the second waveguide,
   a beam shaping structure with a light emitting area for emitting a light beam,
   wherein the second waveguide is configured to guide a light beam coupled from the first waveguide to the beam shaping structure,
   wherein the beam shaping structure is configured to propagate a light beam received from the second waveguide to the light emitting area such that the beam divergence of a light beam emitted from the light emitting area is lower than the beam divergence of the light beam received from the second waveguide,
   wherein the beam shaping structure comprises an optical shaping element, wherein the at least second waveguide directs the light beam coupled from the first waveguide at the optical shaping element, and
   wherein the optical shaping element is a concave mirror or a diffractive optical element.

2. The optical device according to claim 1, wherein the optical shaping element has at least a first axis and a second axis, wherein the focal length of the optical shaping element for the first axis is different than for the second axis.

3. The optical device according to claim 1, wherein the optical shaping element is provided by a polymer structure.

4. The optical device according to claim 3, wherein the polymer structure is a UV-nanoimprinted polymer structure.

5. The optical device according to claim 3, wherein the optical shaping element comprises a reflective coating.

6. The optical device) according to claim 1, wherein the optical device comprises a third waveguide and an optical coupler for coupling a light beam from the first waveguide to the third waveguide, wherein the third waveguide is configured to guide a light beam coupled from the first waveguide to the beam shaping structure, wherein the beam shaping structure is configured to propagate a light beam received from the third waveguide to the light emitting area such that the beam divergence of a light beam emitted from the light emitting area is lower than the beam divergence of the light beam received from the third waveguide, wherein the light beam guided by the second waveguide to the beam shaping structure (5) and the light beam guided by the third waveguide to the beam shaping structure are emitted from the light emitting area with substantially parallel central propagation axes.

7. The optical device according to claim 1, further comprising a substrate, wherein the first waveguide and at least the second waveguide are formed within the substrate.

8. The optical device according to claim 7, wherein the first waveguide and at least the second waveguide are formed by means of direct laser writing.

9. The optical device (1) according to claim 8, wherein the first waveguide and at least the second waveguide are formed by means of femtosecond direct laser writing.

10. A backlight unit, comprising an optical device according to claim 1 and comprising a light source coupled to the first waveguide.

11. The backlight unit according to claim 10, wherein the light source is a laser.

12. A display panel, comprising a backlight unit comprising:
   an optical device for controlling light, the optical device comprising:
   a first waveguide for receiving a light beam from an external light source,
   at least a second waveguide,
   an optical coupler for coupling a light beam from the first waveguide to the second waveguide,
   a beam shaping structure with a light emitting area for emitting a light beam, wherein the second waveguide is configured to guide a light beam coupled from the first waveguide to the beam shaping structure, wherein the beam shaping structure is configured to propagate a light beam received from the second waveguide to the light emitting area such that the beam divergence of a light beam emitted from the light emitting area is lower than the beam divergence of the light beam received from the second waveguide, and a light source coupled to the first waveguide, wherein the display panel comprises at least a first type of light converting structure for converting a light beam emitted from the light source into a first color range, wherein the beam shaping structure is configured such that the light beam guided to the beam shaping structure from the second waveguide and emitted from the light emitting area impinges on a light converting structure of the first type, which light converting structure is associated with a first color subpixel of the display panel.

13. The display panel according to claim 12, wherein the first type of light converting structure comprises a first type of quantum dots or quantum rods.

14. The display panel according to claim 12, wherein the display panel comprises at least a second type of light converting structure for converting a light beam emitted from the light source into a second color range different from the first color range, wherein the beam shaping structure is configured such that the light beam guided to the beam shaping structure from the third waveguide and emitted from the light emitting area impinges on a light converting structure of the second type, which light converting structure is associated with a second color subpixel of the display panel.

15. The display panel according to claim 14, wherein the second color subpixel is neighbouring the first color subpixel.

16. The display panel according to claim 14, wherein the second type of light converting structure comprises a second type of quantum dots or quantum rods.

17. The display panel according to claim 14, wherein the display panel comprises at least a third type of light converting structure for converting a light beam emitted from the light source into a third color range different from the first and the second color range and characterized in that the light source is configured to emit a light beam with a central wavelength which is shorter than a central wavelength of the first, the second and the third color range.

18. The display panel according to claim 17, wherein the third type of light converting structure comprises a third type of quantum dots or quantum rods.

19. The display panel according to claim 14, wherein the light converting structure associated with the first color subpixel and the light converting structure associated with the second color subpixel are separated by a boundary comprising a material which is substantially opaque to at least a central wavelength of the first color range and/or a central wavelength of the second color range.

20. The display panel according to claim 14, wherein the optical device comprises at least a further waveguide and a further optical coupler for coupling a light beam from the first waveguide to the further waveguide, wherein the further waveguide guides the light beam emitted from the light source to the beam shaping structure and the beam shaping structure is also configured such that the beam divergence of a light beam emitted from the light emitting area is lower than that of the light beam guided to the beam structure the further waveguide, shaping by wherein the beam shaping structure is configured such that the light beam guided to the beam shaping structure from the further waveguide and emitted from the light emitting area impinges on an optical diffusing element associated with a third color subpixel of the display panel.

21. The display panel according to claim 14, wherein the light converting structure associated with the first color subpixel and the light converting structure associated with the second color subpixel are provided in a light conversion layer, wherein there is provided for a filter layer, wherein a light beam emitted from the light emitting area passes through the filter layer before reaching the light conversion layer, wherein the filter layer has a higher reflectivity for a central wavelength of a light beam which the light source is configured to emit than for a central wavelength of the first color range.

22. The display panel according to claim 21, wherein the filter layer is a short-pass filter layer.

23. The display panel according to claim 21, wherein the filter layer has a higher reflectivity for a central wavelength of a light beam which the light source is configured to emit than for a central wavelength of the second color range.

24. An optical device for controlling light, the optical device comprising:
a first waveguide for receiving a light beam from an external light source,
at least a second waveguide,
an optical coupler for coupling a light beam from the first waveguide to the second waveguide,
a beam shaping structure with a light emitting area for emitting a light beam,
wherein the second waveguide is configured to guide a light beam coupled from the first waveguide to the beam shaping structure,
wherein the beam shaping structure is configured to propagate a light beam received from the second waveguide to the light emitting area such that the beam divergence of a light beam emitted from the light emitting area is lower than the beam divergence of the light beam received from the second waveguide,
wherein the beam shaping structure comprises an optical shaping element, wherein the at least second waveguide directs the light beam coupled from the first waveguide at the optical shaping element,
wherein the optical shaping element is provided by a polymer structure,
wherein the optical shaping element comprises a reflective coating.

25. An optical device for controlling light, the optical device comprising:
a first waveguide for receiving a light beam from an external light source,
at least a second waveguide,
an optical coupler for coupling a light beam from the first waveguide to the second waveguide,
a beam shaping structure with a light emitting area for emitting a light beam,
wherein the second waveguide is configured to guide a light beam coupled from the first waveguide to the beam shaping structure,
wherein the beam shaping structure is configured to propagate a light beam received from the second waveguide to the light emitting area such that the beam divergence of a light beam emitted from the light emitting area is lower than the beam divergence of the light beam received from the second waveguide,
wherein the optical device comprises a third waveguide and an optical coupler for coupling a light beam from the first waveguide to the third waveguide, wherein the third waveguide is configured to guide a light beam coupled from the first waveguide to the beam shaping structure, wherein the beam shaping structure is configured to propagate a light beam received from the third waveguide to the light emitting area such that the beam divergence of a light beam emitted from the light emitting area is lower than the beam divergence of the light beam received from the third waveguide, wherein the light beam guided by the second waveguide to the beam shaping structure and the light beam guided by the third waveguide to the beam shaping structure are emitted from the light emitting area with substantially parallel central propagation axes.

\* \* \* \* \*